United States Patent Office 3,447,941
Patented June 3, 1969

3,447,941
SPRAYABLE SULFUR ROAD MARKING COMPOSITIONS
Jacqueline C. Kane, Leonia, N.J., assignor to Stauffer Chemical Company, New York, N.Y., a corporation of Delaware
No Drawing. Filed Jan. 31, 1967, Ser. No. 612,805
Int. Cl. C09d *5/26;* E01c *23/16*
U.S. Cl. 106—287                                10 Claims

ABSTRACT OF THE DISCLOSURE

Sulfur road marking compositions stable against degradation by heat and having a viscosity sufficiently low to permit application by spraying. Said compositions comprising: from about 40% to about 96% elemental sulfur, from about 1% to about 20% of a sulfur containing plasticizer, from about 0.05% to about 10% of a chain terminating compound and from about 0% to about 30% of a filler. The sulfur containing plasticizer is selected from: (a) dimercaptans of the formula:

$$HS-Z-SH$$

wherein Z is a divalent organic radical having from 2 to 10 carbon atoms inclusive, and (b) polysulfides of the unit:

$$-[Z'S_x]-$$

wherein Z' is a chalcogen interrupted hydrocarbon of from 2 to 10 carbon atoms inclusive and $x$ is an integer greater than 1.

The chain terminating compound is selected from: (a) monomercaptans of the formula:

$$RSH$$

wherein R is selected from acyl and hydroxyalkyl of from 2 to 20 carbon atoms inclusive, (b) monobasic acid monomercaptans of the formula:

$$HS(CH_2)_n\overset{O}{\underset{\|}{C}}-OR'$$

wherein $n$ is an integer of from 1 to 3 inclusive, and R' is selected from hydrogen, sodium, potassium, ammonium, and alkyl, and hydroxyalkyl of from 1 to 20 carbon atoms inclusive, (c) polysulfides of the unit:

$$-[R''S_{n'}]-$$

wherin R'' is selected from phenyl and aralkyl and alkyl of from 2 to 10 carbon atoms inclusive, and $n'$ is an integer greater than 1, and (d) styrene.

The filler is a finely divided material having an average particle size of from about 0.1 micron to about 300 microns, said filler to include pigments, clays, flours, silicas and the materials commonly used as fillers and extenders, and mixtures thereof.

---

This invention relates to plasticized sulfur compositions and more particularly to plasticized sulfur compositions containing filler, said compositions being characterized by relatively low viscosities and extended pot-lives, making them especially suitable for spray applications.

Considerable research has been conducted on the ultilization of sulfur compositions because of the inherent properties which such compositions exhibit. They are generally inexpensive and resistant to attack by acids, penetration by tree roots, as well as resistant to the action of lubricating oils or gasoline. Accordingly, such compositions have been found useful for jointing brick, sewer pipe, segmental tile, and sewer brick. Sulfur compositions have also found use as road marking materials because of their inherent strength, flexibility and resiliency. Despite the considerable market potential for road marking compositions, the relatively high cost of the materials of these compositions have impeded commercialization. While normally the addition of low cost filler to these compositions could be expected to overcome this problem, compositions containing even a minor amount of filler, i.e., as low as about 2% exhibit such a high increase in voscosity that they are often impossible to apply by spraying. Moreover, compositions of initially low relative viscosity are rendered intolerably viscous after the compositions have been maintained in the molten state the several hours conventionally required for most applications. These deficiencies have not proven insurmountable, however, except when the composition contains a relatively large amount of a finely divided filler. Filler materials are normally used in an amount of from about 5% to about 30% by weight of the total composition. These finely divided fillers generally have an average particle size of from about .01 to about 100 microns. Although a number of materials within the aforesaid particle range will render the sulfur compositions unsprayable by the conventional equipment, the problem is especially troublesome with white compositions.

White compositions normally requiring large amounts of finely divided pigment in order to offset the yellow color imparted by the large sulfur concentration are particularly susceptible to viscosity problems. Pigments, such as titanium dioxide, are additionally believed to react with the sulfur composition to render it more viscous. Consequently, the utilization of fillers and particularly the white pigments such as titanium dioxide have effected considerable difficulty in controlling the viscosity of the marking composition.

It has now been discovered that these problems can be overcome by the provision of plasticized sulfur compositions containing elemental sulfur, a sulfur containing plasticizer, and a small but effective amount of a chain terminating compound. By the term "chain terminating compound" is meant a compound selected from:

(a) Monomercaptans of the formula:

$$RSH$$

wherein R is selected from acyl and hydroxyalkyl of from 2 to 20 carbon atoms inclusive;

(b) Monobasic acid monomercaptans of the formula:

$$HS(CH_2)_n\overset{O}{\underset{\|}{C}}-OR'$$

wherein $n$ is an integer of from 1 to 3 inclusive, and R' is selected from hydrogen, sodium, potassium, ammonium, and alkyl, and hydroxyalkyl of from 1 to 20 carbon atoms inclusive;

(c) Polysulfides of the unit:

$$-[R''S_{n'}]-$$

wherein R'' is selected from phenyl and aralkyl and alkyl of from 2 to 10 carbon atoms inclusive, and $n'$ is an integer greater than 1, and (d) Styrene.

Representing examples of chain terminating compounds include: thiol acids such as thiobenzoic acid, thioacetic acid, thiolauric acid and thiopalmitic acid; alkyl mercaptoalcohols such as mercaptoethanol, mercaptopropanol, mercaptobutanol, mercaptopentanol, mercaptohexanol, mercaptoheptanol, mercaptooctanol, mercaptodecanol, mercaptododecanol and mercaptohexadecanol; monobasic acid monomercaptans and their alkali metal and ammonium salts such as mercaptoacetic acid, mercaptopropionic acid, ammonium thioglycolate, potassium thioglycolate and sodium thioglycolate; monobasic acid ester monomercaptans such as t-butyl mercaptoacetate iso-octyl mercaptoacetate, iso-octyl mercaptopropionate and octadecyl mercaptopropionate; hydroxyalkyl esters of monobasic acid monomercaptans such as hydroxyethyl mercaptoacetate and hydroxyethyl mercaptopropionate; alkyl polysulfides such as diethyl trisulfide, diethyl disulfide, dipropyl tetrasulfide, dihexyl disulfide and didecyl disulfide; aromatic polysulfides such as diphenyl disulfide; aralkyl polysulfides such as dibenzyl disulfide, dibenzyl trisulfide and dibenzyl tetrasulfide; and olefinically unsaturated compounds such as styrene.

Preferred, however, are the aliphatic monomercaptan monobasic acid esters, such as iso-octyl mercaptoacetate and the aliphatic mercapto-alcohols, such as mercaptoethanol. These preferred chain terminating compounds are effective at much lower concentrations than some of the other compounds such as the alkyl monomercaptans.

The plasticizers which can be employed in this invention are selected from:

(a) Dimercaptans of the formula:

HS—Z—SH wherein Z is a divalent organic radical having from 2 to 10 carbon atoms inclusive, and (b) Polysulfides of the unit:

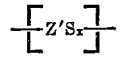

wherein Z' is a chalcogen interrupted hydrocarbon of from 2 to 10 carbon atoms inclusive and $x$ is an integer greater than 1.

For the purposes of this invention, the chalcogen may be either oxygen or sulfur.

Representative examples of dimercaptans include: dimercapto alkanes such as dimercaptoethane, dimercaptopropane, dimercaptobutane, dimercaptohexane and dimercaptodecane; dimercaptodialkyl ethers and thioethers such as dimercaptodiethyl ether, dimercaptodipropyl ether, dimercaptodiethyl thioether and dimercaptodipropyl thioether, and dimercapto dibasic aliphatic acid esters such as ethylene glycol bis(mercaptoacetate) and ethylene glycol bis(mercaptopropionate). Representative examples of chalcogen interruped hydrocarbon polysulfides are triethylene glycol tetrasulfide

[(OCH₂CH₂)₃S₄]

ethylene glycol bis(acetate) tetrasulfide

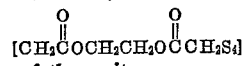

and a polysulfide of the unit

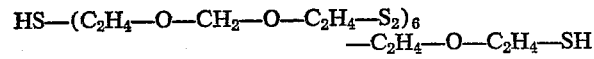

These polysulfides will have a molecular weight between about 500 and 10,000 and preferably between about 500 and 5,000.

Preferred plasticizers in the compositions of this invention are the dimercaptans of the above formula wherein Z is a chalcogen interrupted aliphatic such as are exemplified by β,β'-dimercapto diethyl ether and ethylene glycol bis(mercaptoacetate). These chalcogen interrupted aliphatic dimercaptans have been found superior in road marking compositions by reason of the high impact resistance which these plasticizers impart.

The plasticized compositions can be prepared by first melting the sulfur and then adding either singly or in combination the plasticizer, the chain terminating compound, and any filler which may be desired. It is preferred, however, to dry-mix the plasticizer, elemental sulfur, and any filler employed, heat the mixture until the sulfur is in the molten state, and then add the chain terminating compound. By the dry-mixing method one is able to achieve better dispersion particularly when filler is employed.

It is another embodiment of this invention to utilize a small amount of an alkaline material to aid in combining the sulphur and plasticizer reactants. While the addition of such alkaline material is not required, it is preferred. A variety of bases can be employed such as are exemplified by the alkali metal and alkaline earth metal bases, such as the carbonates, bicarbonates, hydroxides and oxides. Preferred bases include sodium carbonate, calcium carbonate, potassium carbonate, ammonium carbonate, sodium hydroxide and potassium hydroxide. Only a small amount is used, generally less than 1.5% by weight of the composition.

The filler which is intended to include mixtures will have an average particle size of from about .01 micron to about 300 microns. Generally, however, no difficulty will be encountered where the filler has an average particle size in excess of 100 microns unless, of course, the filler is present in an unusually large amount, i.e., in excess of about 20%.

Filler, within the meaning of this invention, is intended to include pigments, as well as the various fillers and extenders commonly employed in sulfur compositions. Representative examples of pigments are the quasi-neutral azo compounds, such as the coupling product of 2-napthol and a second compound such as diazotized p-nitroaniline, 2-nitro-p-toluidine, 2-chloro-4-nitroaniline, 4-chloro-2-nitroaniline, and 2,3-dinitroaniline. Other useful pigments include nitro compounds, such as pigment chlorine GG and Lithol fast yellow GG; arylides of 3-hydroxy-2-napthoic acid, such as the coupling product of diazotized aniline and 2-chloroaniline, paratoluidine and 2,5-dichloroaniline; arylides of acetoacetic acid, such as the coupling product of acetoacetanilide and 2-nitro-p-toluidine. Other useful organic pigments can be found in Kirk-Othmer, Encyclopedia of Chemical Technology, volume 10, pages 660 to 689, 1953, published by the Interscience Encyclopedia, Inc.

Representative inorganic pigments which can be included in this invention include zinc oxide, zinc sulfide, lithopone, titanium dioxide and zirconium oxide. Other inorganic pigments more commonly referred to as white extender pigments include calcium carbonate, magnesium silicate, aluminum silicate, calcium sulfate, barium sulfate, crystalline silica and diatomaceous earth. Although the above list is confined to white pigments, colored pigments can be used as well. Representative examples of which can be found in Kirk-Othmer, ibid, pages 612–659. Other fillers which can be employed include various silicas, clays, flours, and the like.

Other materials which can be employed when the compositions are used as road marking materials include bactericides, such as benzyl-p-chlorophenol, pentachlorophenol or sodium pentachlorophenate. Various reflective materials, such as glass beads can also be employed and are useful in improving the night visibility of the composition.

The elemental sulfur will constitute the bulk of the composition and will normally be present in an amount of from about 40% to about 96%, and preferably from about 63% to about 92% based on the weight of the composition. The sulfur containing plasticizer will be present in an amount from about 1% to about 20%, and preferably from about 4% to about 12%. The chain terminating compound will be present in an amount of from about 0.05% to about 10%, and preferably from about 0.2% to about 5.0%. The filler may constitute up to as much as 30% of the composition but preferably if present at all will not constitute more than about 12% of the composition.

Compositions useful for all marking applications can be prepared by varying the concentration of ingredients. For example, compositions used in heavily trafficked areas will generally contain more plasticizer and less elemental sulfur and filler than that employed for low and non-trafficked areas. The amount of filler employed will also depend on whether white or yellow marking compositions are desired or whether white or yellow marking compositions are desired since the white compositions require a great amount of white pigment to offset the yellow color imparted by the elemental sulfur.

The presents of the chain terminating compound has been found to be effective in reducing the viscosity of pre-compounded as well as freshly prepared plasticized sulfur compositions. Thus, it is possible for one to adjust the viscosity of the finished composition at the site of application by merely introducing incremental amounts of chain terminating compounds. By this means, one can obtain the optimum viscosity for a particular composition. While the utilization of a chain terminating compound is useful in any plasticized sulfur compositions containing a finely divided filler, the compounds are especially useful with finely divided pigments. Accordingly, the chain terminating compound is especially useful for compositions which contain pigments, such as titanium dioxide. In addition, the sulfur composition can be maintained in the molten state for a period sufficient to expend it under normal conditions of use without any apparent increase in viscosity. Moreover, the composition can be cooled to ambient temperature and then remelted without an increase in viscosity.

Illustrative of the invention are the following examples which for convenience are illustrated with the dimercaptodiethyl ether plasticizer and titanium dioxide filler. It is, of course, understood that the other plasticizers and fillers mentioned herein are interchangeable with the aforesaid materials. All parts and percentages in said examples are on a weight basis.

EXAMPLES 1–4

In a 4 liter metal container, the following materials are dry-mixed: 200 grams of $\beta,\beta'$-dimercapto-diethyl ether, 400 grams titanium dioxide, 20 grams of calcium carbonate, and 1400 grams of elemental sulfur. The mixture is heated to a temperature of 150° C. and the viscosity is measured on a Brookfield Model LVF viscometer fitted with an F-bar spindle. Readings at 6, 12 and 30 r.p.m. were taken and are reported in Table I under "Control." Incremental amounts of various capping compounds were added to 3 different 500 gram portions of the mixture and the viscometer readings are given below in Table I.

TABLE I

| Capping compound | Weight (grams) | Viscometer reading | | |
|---|---|---|---|---|
| | | 6 r.p.m. | 12 r.p.m. | 30 r.p.m. |
| (1) Control | 40 | 49 | 69 | 100 |
| (2) Mercaptoethanol | 40 | 12 | 15 | 24 |
| (3) n-Amyl mercaptan | 40 | 38 | 52 | 76 |
| (4) Iso-octyl mercaptoacetate | 40 | 18 | 21 | 28 |

In order to evaluate the compositions for spraying, the following test is conducted. To a one pound stainless steel tank fitted with a flat spray tip having a .072" orifice diameter and spray angle at 40 p.s.i. of 65°, is added the composition of Example 1. The tank is then closed, pressurized to a pressure of 100 lbs. p.s.i. and suspended in a high temperature hydrocarbon heat exchange fluid at a temperature of 140° C. An attempt to spray the composition is unsuccessful. The compositions of Examples 2, 3 and 4 are then substituted for Example 1 in the stainless steel tank. The compositions of Examples 2 and 4 are easily sprayable while the composition of Example 3 is not sprayable.

Apparent from the data reported in Table I is the efficacy of the chain terminating compounds over the control composition of Example 1 and the alkyl monomercaptan of Example 3.

EXAMPLES 5–8

In order to determine the effect of mercaptoethanol at lower concentrations, the procedure of the preceding examples was repeated for this compound at various concentrations. The results are shown in Table II.

TABLE II

| Capping compound | Weight (grams) | Viscometer reading | | |
|---|---|---|---|---|
| | | 6 r.p.m. | 12 r.p.m. | 30 r.p.m. |
| Mercaptoethanol | 30 | 18 | 20 | 24 |
| | 20 | 22 | 27 | 36 |
| | 10 | 24 | 32 | 44 |
| | 2 | 37 | 48 | 71 |

The above data illustrates the effectiveness of a preferred mercaptan at concentrations, as low as 0.1%. Other superior chain terminating compounds found include: t-butyl mercaptoacetate, mercaptoacetic acid, mercaptopropionic acid, diphenyl disulfide, dibenzyl tetrasulfide, diethyl trisulfide and styrene.

What is claimed is:
1. A plasticized sulfur composition comprising:
 (A) from about 40% to about 96% elemental sulfur;
 (B) from about 1% to about 20% of a sulfur containing plasticizer selected from:
  (a) dimercaptans of the formula:

HS—Z—SH wherein Z is a divalent organic radical having from 2 to 10 carbon atoms inclusive, and
 (C) from about 0.05% to about 10% of a chain terminating compound selected from:
  (a) monomercaptans of the formula:

RSH wherein R is selected from acyl and hydroxyalkyl of from 2 to 20 carbon atoms inclusive;
  (b) monobasic acid monomercaptans of the formula:

$$HS(CH_2)_n \overset{O}{\underset{\|}{C}}-OR'$$

wherein $n$ is an integer of from 1 to 3 inclusive and R' is selected from hydrogen, sodium, potassium, ammonium, and alkyl and hydroxyalkyl of from 1 to 20 carbon atoms inclusive.
2. The composition of claim 1 additionally containing from 2% to about 30% of a filler having an average particle size of from about .01 micron to about 300 microns.
3. The composition of claim 2 wherein the components are present in the following concentrations by weight:

| | Percent |
|---|---|
| Elemental sulfur | 55.0–92.8 |
| Sulfur containing plasticizer | 4.0–12.0 |
| Chain terminating compounds | 0.2–5.0 |
| Filler | 3.0–30.0 |

4. The composition of claim 3 wherein the sulfur containing plasticizer is dimercapto diethyl ether.
5. The composition of claim 3 wherein the chain terminating compound is mercaptoethanol.
6. The composition of claim 3 wherein the chain terminating compound is iso-octyl mercaptoacetate.
7. The composition of claim 3 wherein the filler is titanium dioxide.
8. The composition of claim 3, wherein the chain terminating compound is mercaptoethanol, the filler is titanium dioxide having an average particle size of from about .01 micron to about 300 microns, and the sulfur containing plasticizer is dimercapto diethyl ether.
9. A process for preparing a sprayable sulfur road marking composition comprising:
 (A) from about 40% to about 96% of elemental sulfur.
 (B) from about 1% to about 20% of a sulfur containing plasticizer selected from:
  (a) dimercaptans of the formula:

HS—Z—SH wherein Z is a divalent organic radical having from 2 to 10 carbon atoms inclusive, and
(C) from about 0.05% to about 10% of a chain terminating compound selected from:
 (a) monomercaptans of the formula:

RSH wherein R is selected from acyl and hydroxyalkyl of from 2 to 20 carbon atoms inclusive;
 (b) monobasic acid monomercaptans of the formula:

$$HS(CH_2)_n\overset{O}{\underset{\|}{C}}-OR'$$

wherein $n$ is an integer of from 1 to 3 inclusive and R' is selected from hydrogen, sodium, potassium, ammonium, and alkyl and hydroxyalkyl of from 1 to 20 carbon atoms inclusive;
(D) from about 2% to about 30% of a filler having an average particle size of from about .01 micron to about 300 microns;
each of said percentages based on the total weight of the above components, which comprises: reacting the elemental sulfur, sulfur containing plasticizer and chain terminating compound in the presence of the filler.

10. The process of claim 9 which comprises first reacting the elemental sulfur and sulfur containing plasticizer and then reacting the resultant product with the chain terminating compound.

References Cited

UNITED STATES PATENTS 3,316,115   4/1967   Barnes et al. _____ 106—287

ALLAN LIEBERMAN, *Primary Examiner.*

U.S. Cl. X.R.

94—1.5

PO-1050
(5/69)

UNITED STATES PATENT OFFICE
CERTIFICATE OF CORRECTION

Patent No. 3,447,941          Dated June 3, 1969

Inventor(s) Jacqueline C. Kane

It is certified that error appears in the above-identified patent and that said Letters Patent are hereby corrected as shown below:

In the specification, Column 1, line 49, "wherin" should read -- wherein --; Column 1, line 64, "ultilization" should read -- utilization --.

Column 2, line 9, "voscosity" should read -- viscosity --.

Column 5, line 1, cancel beginning with "or whether" to and including "are desired" in Column 5, line 2.

Column 6, line 43, after inclusive cancel "." and insert -- ; wherein each of said percentages are based on the total weight of the composition. --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents